United States Patent [19]

Gubler

[11] Patent Number: 5,421,513

[45] Date of Patent: Jun. 6, 1995

[54] CONVEYING DEVICE FOR EXACT METERING, WHEREIN AT LEAST ONE PROJECTING BODY IS ROTATED IN AN INNER, DISRUPTED THREADED GROOVE, AND A USE THEREFOR

[75] Inventor: Daniel Gubler, Fallanden, Switzerland

[73] Assignee: Danag AG, Fallanden, Switzerland

[21] Appl. No.: 137,042

[22] PCT Filed: Feb. 16, 1993

[86] PCT No.: PCT/CH93/00040

[87] PCT Pub. No.: WO 93/15985

PCT Pub. Date: May 15, 1980

§ 371 Date: Dec. 20, 1993

§ 102(e) Date: Dec. 20, 1993

[30] Foreign Application Priority Data

Feb. 18, 1992 [DE] Germany ................ 42 04 852.4

[51] Int. Cl.⁶ ...................... B65G 33/12; B65G 65/46
[52] U.S. Cl. ........................ 239/1; 239/689; 222/414; 198/724
[58] Field of Search ............ 239/689, 681, 687, 214, 239/218.5; 222/414, 410; 198/723, 724

[56] References Cited

U.S. PATENT DOCUMENTS

| 425,338 | 4/1890 | Muller | 239/689 |
|---|---|---|---|
| 2,934,201 | 4/1960 | O'Brien | |
| 3,071,240 | 1/1963 | Graham et al. | 198/724 |
| 4,029,028 | 6/1977 | Griffiths | 222/410 |
| 4,986,475 | 1/1991 | Spadafora et al. | 239/218.5 |

FOREIGN PATENT DOCUMENTS

| 0112398 | 7/1984 | European Pat. Off. |
| 2618377 | 11/1976 | Germany . |
| 91/15412 | 10/1991 | WIPO . |

OTHER PUBLICATIONS

Japanese Patent Abstract, "Feeding Device for Solid Tablet", vol. 11, Abstract No. 296, Japanese Patent Application No. 60-229385, published Apr. 23, 1987.

Primary Examiner—Karen B. Merritt
Attorney, Agent, or Firm—Burns, Doane, Swecker & Mathis

[57] ABSTRACT

A conveying device for metering of bulk material includes a sleeve having an interior region having an inner threaded groove. The threaded groove is disrupted by a plurality of cross-wise extending compensating grooves. The conveying device further includes a rotatable part, at least a portion of the rotatable part being disposed inside of the interior region of the sleeve. The rotatable part has one or more flexible first bodies, an outermost point of the first bodies extending to an inner wall of the sleeve. The device conveys bulk material as the rotatable part rotates such that the first bodies move along the threaded groove from one compensating groove to a next compensating groove.

13 Claims, 2 Drawing Sheets

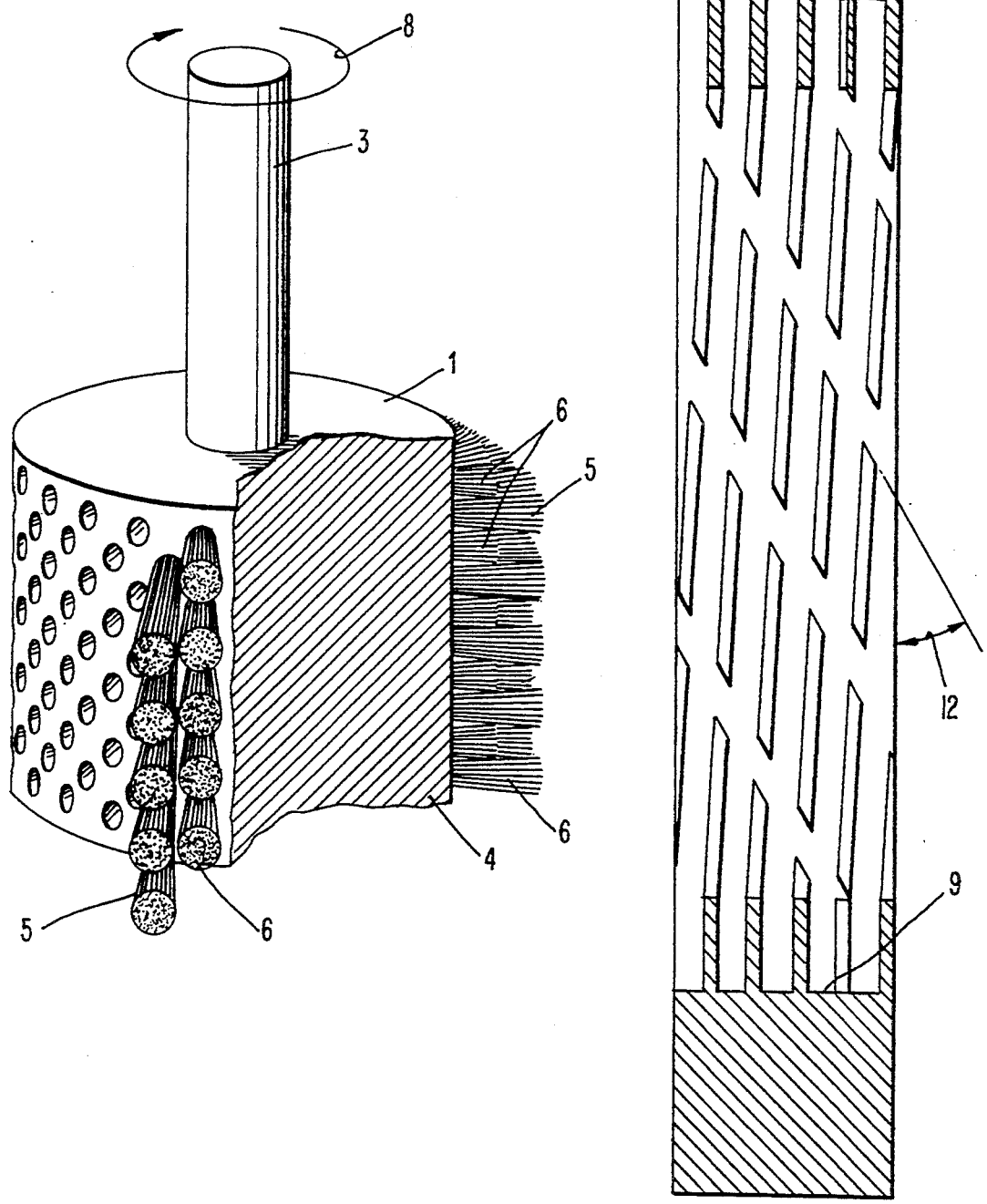

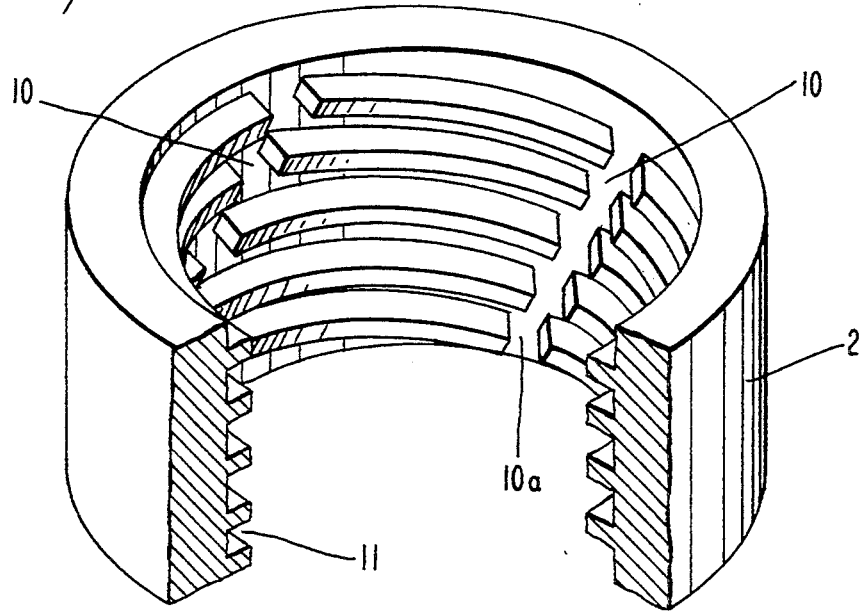
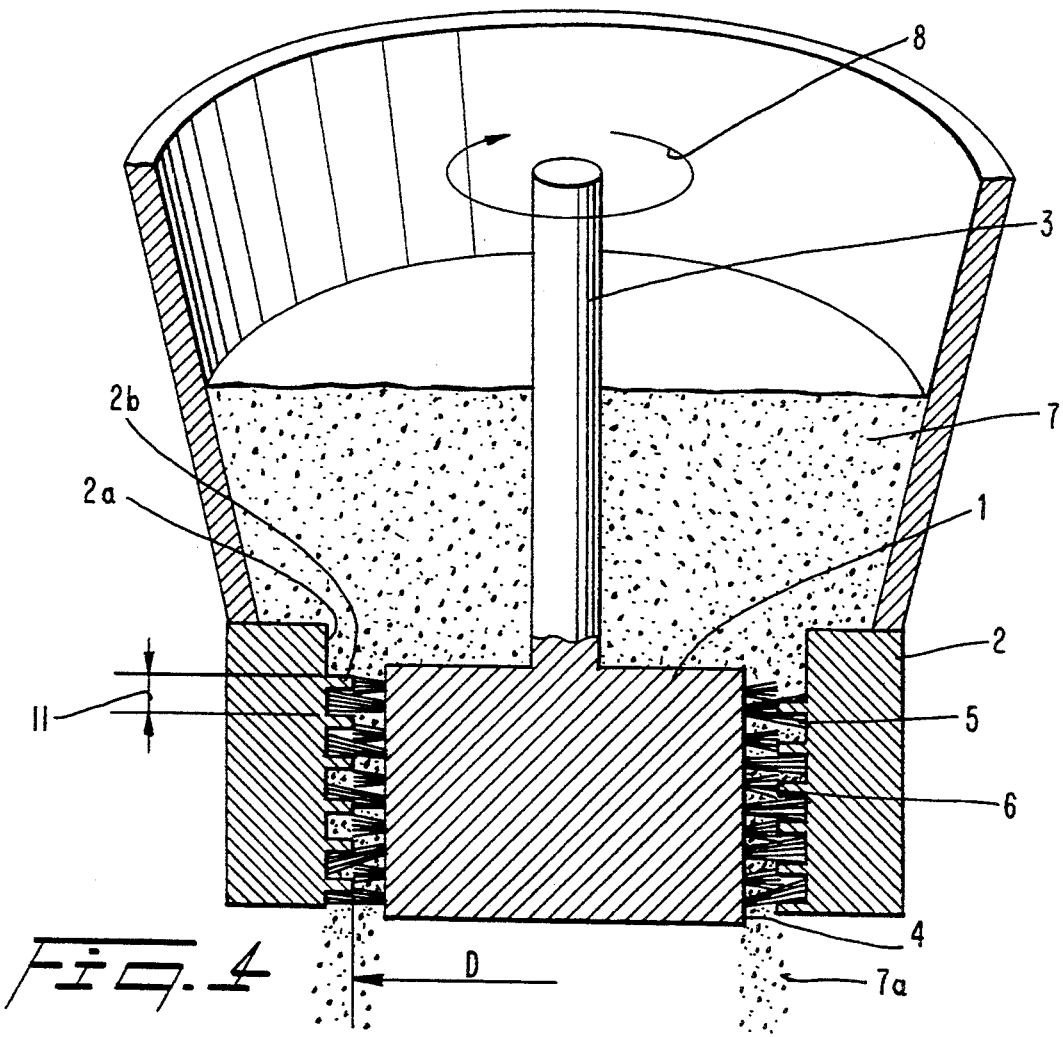

CONVEYING DEVICE FOR EXACT METERING, WHEREIN AT LEAST ONE PROJECTING BODY IS ROTATED IN AN INNER, DISRUPTED THREADED GROOVE, AND A USE THEREFOR

FIELD OF THE INVENTION

The present invention relates to a conveying device.

BACKGROUND

Worm conveyors or vibration devices are usually employed for conveying a metered amount of bulk material.

To assure their operation, worm conveyors require a minimum gradient and a minimum diameter. With the components unchanged, it is possible to adjust the amounts to be conveyed up to a certain point by varying the rpm. In principle, however, with worm conveyors it is possible to achieve a satisfactory solution only with large-size bulk materials per unit of time.

For most bulk materials the lowest possible gradient is too high to assure, with vertical installation, the prevention of a run-off in respect to the storage bin. With embodiments with hollow spirals in particular there is no sealing.

Although a buildup of material (dirt) at the tube part of worm metering devices is prevented by the constant movement of the worm, the worm itself can easily experience an accumulation of material.

Vibrating metering devices permit very small metered amounts, but are very sensitive to jarring (regarding the unwanted emptying of the storage bin) and cannot be disposed vertically underneath a storage bin (require an inclined outlet surface). Furthermore, some bulk materials tend to form small lumps under vibration.

SUMMARY OF THE INVENTION

An object of the present invention is the provision of a conveying device of the previously mentioned type which is able, by means of a variation in rpm alone, to make maximize metered amounts of material while minimizing inaccuracies in weight per unit of time.

Advantages of the invention are to be found in that the device is a simple and sturdy construction, can easily be connected to a motor and can be employed with all known bulk materials. By only varying the rpm, it is possible to achieve metered amounts over the largest range and with maximized accuracy of weight per unit of time with one and the same device. With pulverulent bulk materials it is possible to assure a range between 0.05 and 1000 1/hr along with the desired accuracy.

Further advantages of the invention include continuous self-cleaning of the device during operation, i.e., no bothersome residues are formed in the conveying mechanism, which is an important reason for being able to maintain the accuracy of weight per unit of time provided over the entire length of the operation, even with continuous multi-shift operations.

Furthermore, another advantage of the invention is to be found in that the conveying device is constructed in an extremely compact manner, for which reason it can be employed without problems even in connection with spatially limited conveying conduits.

In accordance with one aspect of the present invention, a conveying device for metering of bulk material includes a sleeve having an interior region having an inner threaded groove. The threaded groove is disrupted by a plurality of cross-wise extending compensating grooves. The conveying device further includes a rotatable part, at least a portion of the rotatable part being disposed inside of the interior region of the sleeve. The rotatable part has one or more flexible first bodies, an outermost point of the first bodies extending to an inner wall of the sleeve. The device conveys bulk material as the rotatable part rotates such that the first bodies move along the threaded groove from one compensating groove to a next compensating groove.

BRIEF DESCRIPTION OF THE DRAWINGS

An exemplary embodiment of the invention will be described in detail by means of the drawings. All elements not required for the direct comprehension of the invention have been omitted. In the various drawing figures, like elements have been provided with the same reference numerals. In the drawings:

FIG. 1 is a partially cross-sectional, perspective, schematic view of a rotating part of a conveying device according to an embodiment of the present invention;

FIG. 2 is a partially cross-sectional, perspective, schematic view of a stationary part of a conveying device according to an embodiment of the present invention;

FIG. 3 is a partially cross-sectional schematic side view of a stationary part of a conveying device according to an embodiment of the present invention; and FIG. 4 is a partially cross-sectional schematic side view of a bulk material conveying device according to an embodiment of the present invention.

DETAILED DESCRIPTION

In the following description of an exemplary embodiment of the invention emphasis is placed on FIG. 4, and the other drawing figures, which are intended per se to provide an explanatory effect, are referred to as needed.

FIG. 4 illustrates a conveying device comprising a stationary part in the form of a sleeve 2 (see FIG. 2) and a rotating part 1 (see FIG. 1). During operation, the sleeve 2 remains anchored at the respective place by means of a removable or fixed connection; the rotating part 1 does not have any degree of play in the axial direction. (Of course, there is the option of designing this configuration in the opposite way, i.e., the sleeve is a rotating part and the part identified by reference numeral 1 is stationary). For this purpose the rotating part 1 has a clamping bolt which is non-positively connected with a motor, not shown. This motor is preferably equipped with a variable speed gear in order to perform, in accordance with the object of the invention, metering of a defined bulk material by means of varying the rpm. It is of course also possible to employ similar units. If a constant amount of the bulk material must be provided by means of a conveying device over an extended period of time, it is easily possible to provide a drive device with permanent rpm. The rotating part 1 is comprised of a clamping bolt 3 and a cylindrical bristle core 4. On its casing surface the latter has several bristle bundles 5, 6, consisting of a plurality of fibers. The bristle bundles 5, 6 are arranged in the axial plane of the bristle core 4 in rows which are at a distance from each other and have alternatingly long and short bristle bundles. As needed, these bristle bundles can easily be replaced by individual tuft-like shapes of a flexible material, for example rubber. The bristle core 4 rotates inside the sleeve 2, which is provided with a threaded groove 9 (see FIG. 3) on the inside. The inner diameter 2b and the outer diameter 2a of the threaded groove 9 correspond to the respective bristle bundles: the long bristle bundles 5 correspond to the outer diameter 2a, the short bristle bundles 6 to the inner diameter 2b of the threaded groove 9. The short bristle bundles 6 thus center the bristle core 4 in respect to the inner diameter 2b of the threaded groove 9 and in this way seal the clear inner diameter D of the sleeve 2 in the upward direction against the bulk material 7 flowing in from above. One or a plurality of compensating grooves 10 (see FIG. 2), which take up an essentially acute angle in respect to the bore axis of the sleeve 2, are disposed opposite to the direction of the lead or gradient of the threaded groove 9 and are distributed in the circumferential direction. If a plurality of compensating grooves 10 is provided, they are evenly distributed in the circumferential direction. The rpm of the bristle bundles and the cross-sectional dimensions of the threaded groove 9 determine the amount of the respective bulk material 7 conveyed. The material 7 to be conveyed is placed in the radial space between one bristle bundle 5 to the next and is conveyed along the first thread. The bristle bundles 5, which are arranged in straight lines and radially, are forcibly bent by the gradient 11 of the threaded groove 9 in the course of the rotation 8 of the bristle core 4. To regain their original shape, these bristle bundles 5 use the subsequent compensating groove 10 as a restoration path and in the course of this spring into the next higher threaded groove, where they continue their conveying work. The material to be conveyed is successively transported through the entire sleeve 2. The materials of the bristle bundles, the gradient 11 of the threaded groove 9, the width of this groove (see FIG. 2) and the number of compensating grooves 10 have been selected such that the permissible flexibility of the bristles is not exceeded and they again assume their original shape after their compensating movement in the relief slit 10. An average distance between two consecutive rows of bristle bundles 5 corresponds to a lead of the threaded groove 9. By means of this compensating movement, characterized by the snapping back of the fibers of the bristle bundles, self-cleaning of the bristle bundles 5 as well as of the compensating grooves 10 is assured.

The angle 12 (see FIG. 3) of the compensating groove 10 in relation to the bore axis of the sleeve 2 has been selected such that the vertically or helically arranged bristle bundles 5 close off a free drop path for the bulk material 7 to be conveyed. An alternative solution consists in arranging the compensating groove 10 vertically and provide a corresponding thread-like path for the bristle bundles 5, which again closes off the drop path. With such a configuration, the bristle bundles 5, 6 describe helical paths on the casing surface of the bristle core 4.

The conveyance of the bulk material 7, i.e. the amount 7a conveyed, consists of two components: forced conveyance for the one part, and free conveyance which is a function of the flowability of the respective material.

In the course of forced conveyance, the bulk material 7 is forcibly conveyed by the bristle bundles 5 along the threaded groove 9 over the entire length inside the sleeve 2.

During free conveyance, the material 7 or 7a to be conveyed drops out of the sleeve 2 through the lowermost relief slits 10a (see FIG. 2). Because of this, the filling degree of the groove above it is reduced and is partially filled from the next higher groove via the compensating grooves 10. This process is continued in the groove located above it in accordance with the flow properties of the respective bulk material 7 to be conveyed.

The entire conveying output thus consists of the two said components which, of course, depends on the flow properties of the respective bulk material 7 to be conveyed, wherein in the extreme case the entire conveying output may consist of only one conveying component. Thus the possibility arises to operate the forced conveyance opposite to the basic conveyance direction if the component from the free conveyance is appropriately large, based on the flow properties of the respective bulk material 7 to be conveyed. In this case the conveyed amount 7a can be further reduced, sometimes minimized. The selected flexibility of the bristle bundles 5 must be great enough that they can survive without damage the travel of a defined sector path, in the present case 120° of the circumference. All edges are rounded and the surfaces polished inside the threaded groove 9, so that the bristle bundles 5 are not damaged by fraying and thus could no longer do justice to their task. While this invention has been illustrated and described in accordance with a preferred embodiment, it is recognized that variations and changes may be made therein without departing from the invention as set forth in the claims.

What is claimed is:

1. A conveying device for metering of bulk material, comprising:
   a sleeve having an interior region having an inner threaded groove, the threaded groove being disrupted by a plurality of cross-wise extending compensating grooves; and
   a rotatable part, at least a portion of the rotatable part being disposed inside of the interior region of the sleeve, the rotatable part having one or more flexible first bodies, an outermost point of the first bodies extending to an inner wall of the sleeve, wherein the device conveys bulk material as the rotatable part rotates such that the first bodies move along the threaded groove from one compensating groove to a next compensating groove.

2. A conveying device in accordance with claim 1, wherein the rotatable part includes one or more second bodies, an outermost point of the second bodies extending to an innermost point of the threaded groove.

3. A conveying device in accordance with claim 2, wherein the first bodies include first bristle bundles and the second bodies include second bristlee bundles.

4. A conveying device in accordance with claim 3, wherein the first and second bristle bundles of the first and second bodies, respectively, are arranged in a plurality of spaced-apart rows in an axial plane of a casing surface of a casing body of the rotatable part.

5. A conveying device in accordance with claim 4, wherein the first and second bristle bundles of the first and second bodies, respectively, are arranged at a distance from one another in a circumferential direction of the rotatable part.

6. A conveying; device in accordance with claim 4, wherein the first and second bristle bundles of the first and second bodies, respectively, are arranged in alternating rows of first and second bristle bodies disposed at a distance from one another in a circumferential direction of the rotatable pan.

7. A conveying device in accordance with claim 6, wherein an average distance between two consecutive rows of first bristle bundles corresponds to a lead of the threaded groove.

8. A conveying device in accordance with claim 3, wherein the first and second bristle bundles are arranged relative to one another on a casing surface of the rotatable part such that the first and second bristle bundles describe helical paths on the casing surface of the rotatable part.

9. A conveying; device in accordance with claim 8, wherein the first and second bristle bundles of the first and second bodies, respectively, are arranged in alternating rows of first and second bristle bodies disposed at a distance from one another in a circumferential direction of the rotatable part.

10. A conveying device in accordance with claim 1, wherein the compensating grooves are distributed along a length of the threaded grooves such that compensating grooves in successive turns of the threaded groove form an acute angle to a bore axis of the sleeve.

11. A conveying device in accordance with claim 1, wherein the compensating grooves are distributed along the length of the threaded groove such that compensating grooves in successive turns of the threaded groove are arranged in a pattern in a direction opposite to a gradient direction of the threaded groove.

12. A conveying device in accordance with claim 1, wherein each one of the plurality of compensating grooves is separated from a succeeding and a preceding one of the plurality of compensating grooves by approximately 120°.

13. A method of conveying bulk material, comprising the steps of:
   introducing bulk material to a first end of a sleeve, the sleeve having an interior region having an inner threaded groove, the threaded groove being disrupted by a plurality of cross-wise extending compensating grooves;
   rotating a rotatable part disposed inside of the interior region of the sleeve, the rotatable part having one or more flexible first bodies, an outermost point of the first bodies extending to an inner wall of the sleeve, the first bodies moving along the threaded groove as the rotatable part is rotated, the bulk material introduced to the first end of the sleeve being conveyed toward a second end of the sleeve as the rotatable part rotates, the first bodies moving along the threaded groove from one compensating groove to a next compensating groove.

* * * * *